J. S. JOHNSTON.
RIM.
APPLICATION FILED JUNE 6, 1916.
1,223,797.
Patented Apr. 24, 1917.
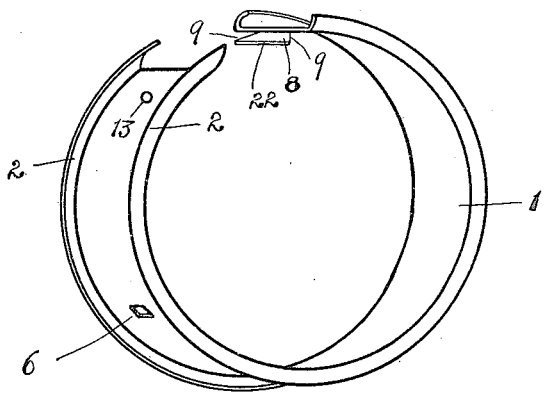
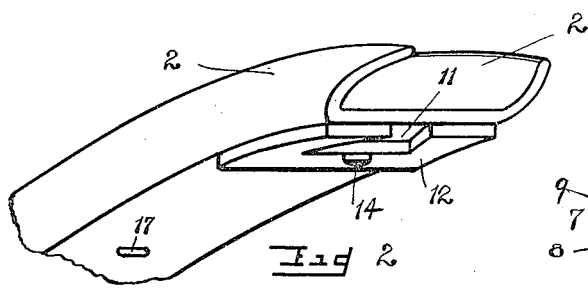
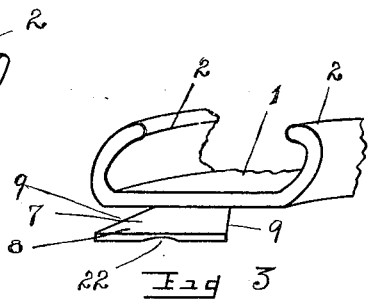
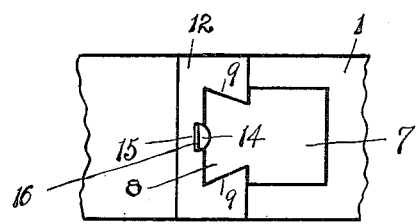
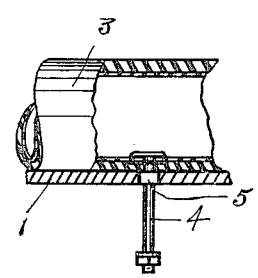
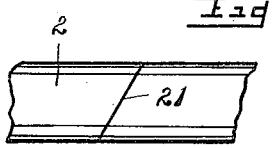
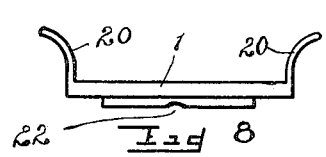
INVENTOR
JAMES S JOHNSTON
BY
ATTORNEY

UNITED STATES PATENT OFFICE.

JAMES S. JOHNSTON, OF UTICA, NEW YORK.

RIM.

1,223,797.  Specification of Letters Patent.  Patented Apr. 24, 1917.

Application filed June 6, 1916. Serial No. 102,082.

*To all whom it may concern:*

Be it known that I, JAMES S. JOHNSTON, a citizen of the United States, residing at Utica, in the county of Oneida and State of New York, have invented certain new and useful Improvements in Rims, of which the following is a specification, reference being had therein to the accompanying drawing.

My invention relates to a rim and I declare the following to be a full, clear, concise and exact description thereof sufficient to enable anyone skilled in the art to which it appertains to make and use the same, reference being had to the accompanying drawings in which like reference characters refer to like parts throughout the specification.

The object of the invention is to provide a rim that is split transversely and having ends which can be locked in a detachable manner, whereby the rim will be prepared to hold a pneumatic tire for assembling upon the felly of a wheel of an automobile.

The rim also embodies means for preventing the valve stem of the inner tube of the pneumatic tire from turning, after the parts are in position, and thereby tearing or in other respects injuring the inner tube of the tire to which said valve stem is attached.

The object will be seen from the drawings in which—

Figure 1 is a perspective view of the rim;

Fig. 2 is a perspective view of a fragment of the rim, showing one of the detachable ends thereof;

Fig. 3 is a perspective view of a fragment of the rim, showing the end opposite that shown in Fig. 2;

Fig. 4 is a plan view of a fragment of the rim, showing the ends locked;

Fig. 5 is an enlarged perspective view of a headed bolt employed;

Fig. 6 is a detail view showing a central vertical section of the rim and partially of a pneumatic tire at the location of the aperture in the rim for the projection of the valve stem;

Fig. 7 is a side elevation of a fragment of the rim, showing the bevel on which the flanges are cut;

Fig. 8 is a transverse elevation of one of the ends, showing a modification in the manner of forming the flanges.

Referring more particularly to the drawings, the rim is represented by —1— and has the lateral annular flanges 2—2 adapted to hold the edges of a pneumatic clencher tire 3 provided with a valve stem 4 with a square shaped portion 5 adapted to be housed in the correspondingly formed hole 6 of the rim —1—, when said tire 3 is mounted upon the rim —1— in assembled position. The employment of a square hole 6 in the rim —1— for housing the like part 5 of the valve stem 4 will prevent the valve stem 4 from turning, when the parts are assembled, and thereby loosening itself from its normal position in the tire 3 or from tearing said tire.

The rim —1— is split transversely and on a bevel, as at 21. The means for holding the free ends of the rim —1— together in a detachable manner, embodies a member 7 fastened by rivets or by welding to the under surface of one end of the rim —1— and having a projecting portion or tongue 8. The sides 9—9 of the tongue 8 converge toward the contiguous end of the rim —1—, whereby to form of the tongue 8 a member that will dovetail into a corresponding shaped matrix or recess 11 made in the plate 12 fixed to the other end of the rim —1— by rivets or by welding.

A headed bolt 13 is screw mounted into a threaded aperture extending through the plate 12 and into the rim —1—, the inner end of the bolt 13 fitting flush with the adjacent surface of the rim —1—. This threaded aperture is located in proximity to the recess 11 of the plate 12, whereby the semihead 14 of the bolt 13 will cover the contiguous end of the tongue 8, which is beveled at 22 for the reception of the overhanging portion of the head 14, in order to lock the tongue 8 within the recess 11. The said head 14 of the bolt 13 is cut away at 15 to provide a clearance for the tongue 8, when the bolt 13 is turned at an angle of approximately one hundred eighty degrees, to thereby permit the ends of the rim —1— to separate. The bolt 13 can be turned by inserting a suitable tool within the groove 16 countersunk in the head 14 and then turning.

The flanges 20 illustrated in Fig. 8 are adapted to mount tires other than those of the clencher make.

In place of the square hole 6 illustrated in Fig. 1, an elongated hole 17 having rounded ends, as shown in Fig. 2, may be employed to keep the valve stem 4 from turning.

Having thus described my invention, what I claim as new and desire to secure by Letters Patent is:

1. In a rim split transversely, an end having a tongue, another end having a plate with a matrix adapted to receive said tongue, and a bolt having a head mounted in said plate adjacent one of said ends, whereby to lock the tongue in said matrix, and said bolt having its head partially cut away, whereby to release said ends.

2. In a rim split transversely, an end having a tongue with converging sides, another end having a plate with a matrix adapted to receive said tongue, whereby to prevent the lateral or endwise displacement of said ends, and a bolt screw mounted in said plate, whereby to prevent the vertical displacement of said ends, said bolt having its head partially cut away, whereby to release said ends, when said bolt is turned in given position.

3. In a rim split transversely, an end having attached thereto a tongue with converging sides, a plate having a matrix adapted to receive said tongue, said plate being attached to the opposite end of said rim, a bolt screw mounted in said plate, whereby to lock the tongue in said matrix, and said bolt having its head partially cut away, whereby to release said ends.

In testimony whereof I have affixed my signature.

JAMES S. JOHNSTON.

Copies of this patent may be obtained for five cents each, by addressing the "Commissioner of Patents, Washington, D. C."